UNITED STATES PATENT OFFICE.

EDWARD STOW AND CHARLES B. OVERBAUGH, OF EUFAULA, ALABAMA.

PREPARED COCOANUT.

SPECIFICATION forming part of Letters Patent No. 262,497, dated August 8, 1882.

Application filed May 19, 1882. (Specimens.)

*To all whom it may concern:*

Be it known that we, EDWARD STOW and CHARLES BATES OVERBAUGH, citizens of the United States, residing at Eufaula, in the county of Barbour and State of Alabama, have invented certain new and useful Improvements in Prepared Cocoanut; and we do declare the following to be a full, clear, and exact description of the invention, such as will enable others skilled in the art to which it appertains to make and use the same.

The object of our invention is the production of a cocoanut-confection for domestic purposes which will always be found to be in a state fit for immediate use, and retaining all of the oil and natural flavor of the nut. To effect this object we make use of the following ingredients and process, viz: ten (10) pounds of grated cocoanut, twenty (20) ounces of "A" sugar, forty (40) ounces of glucose. These ingredients, being mixed and put into a steam copper vat, are subjected to a slow heat, not boiling, and simmered until the sugar is absorbed by the nut. We then add three and one-third ($3\frac{1}{3}$) pounds of granulated sugar and rub in dry.

By the use of the glucose we give to the preparation a transparent appearance, and it is at all times of a moist nature, so that it can be packed perfectly solid, thereby stopping the evaporation of the flavor and strength and preventing the circulation of air through it, as is common with preparations of cocoanut put up in paper boxes and cans in a dry and crystallized state.

We are aware that cocoanut has been prepared by mixing sugar and the grated meat, and then subjecting the mixture to heat, and also that the grated meat has been subjected to a heating process to expel moisture before being mixed with the sugar; but no manufacturers that we are aware of make any use of glucose in their preparations. A moist and transparent article cannot be produced by the use of sugar alone. In the process of cooking it is necessary to stir the ingredients constantly to keep them from becoming dark by lying too long on the sides or bottom of the kettle; and if sugar alone were used, and no glucose, under such an agitation the sugar would granulate before the ingredients were thoroughly cooked. By the use of glucose the meat is preserved in a sirup and the water allowed to evaporate. When the water has evaporated the glucose collects on or adheres to each particle of the nut, stopping fermentation as far as any process can. The use of granulated sugar dry, after the ingredients have gone through the first process, serves to absorb the surplus oil not extracted by the heat in the process of cooking. Otherwise this oil would leave the preparation and penetrate the wrappers of the packages in which it might be put up. We know from experience and practical knowledge that brown sugar will not produce the same or as good an article as that we make by the use of glucose. Brown sugar makes a dark or brown article, and it will granulate, as it contains more saccharine matter than glucose. Glucose is white, and it will not granulate unless brought in contact with larger proportions of cane-sugar. Two parts of cane-sugar and one part glucose boiled together at about 260° Fahrenheit and agitated will produce a fine granulated paste, which will be affected by damp weather, and finally go back to sirup by absorption from the atmosphere. Brown sugar alone so treated would produce a hard granulated mass that would be affected only by an intense heat of boiling water to reduce it to sirup.

Our process of heating in a steam-jacketed copper extracts the water from the cocoanut and prevents fermentation, while the thorough saturation with sugar effected at the same time produces a perfectly-preserved article, which retains all of the oil and natural flavor of the nut. It will keep in any climate for any length of time, and requires no additional sugar when desired for the table, or the preparation of cakes, pies, or other articles of dessert.

We claim as of our invention and desire to secure by Letters Patent—

An improved preparation of cocoanut for food purposes, consisting of grated cocoanut, sugar, and glucose, as herein described and set forth.

In testimony whereof we affix our signatures in presence of two witnesses.

EDWARD STOW.
    CHARLES BATES OVERBAUGH.

Witnesses:
 TURNER WOODSON PATTERSON,
 CHARLES E. CORY.